Patented Feb. 21, 1939

2,147,757

UNITED STATES PATENT OFFICE 2,147,757

COATED MATERIALS AND PROCESS OF MAKING SAME

George Schneider, Montclair, N. J., assignor to Celanese Corporation of America, a corporation of Delaware No Drawing. Application November 9, 1934, Serial No. 752,257

16 Claims. (Cl. 154—2)

This invention relates to impregnating articles with compositions comprising thermoplastic compounds and relates more particularly to the impregnating of fabric, paper and similar materials with a thermoplastic derivative of cellulose with the aid of heat and pressure.

An object of this invention is the economic and expeditious production of stronger and more flexible plastic impregnated materials than was heretofore possible. Another object of this invention is the production of an impregnated material in which there is a superior adhesion of the impregnating plastic material to the base material. Other objects of the invention will appear from the following detailed description.

In applying a coating of thermoplastic material to a base material such as a fabric, paper, etc., it is customary to preheat such material prior to adding the thermoplastic material. This action causes a drying out of the base material and even in some cases a charring of same which causes the material to become brittle, discolored and of such a nature that the plastic material, although going into the interstices of the material, does not readily adhere thereto in the sense of becoming integral with the body of the base material. In accordance with this invention I pretreat the fabric, prior to heating it, with an agent to replace, wholly or partially, the naturally contained water or moisture thereof so that during the heating operation the fabric or other material employed as a base does not dry out.

By employing this invention, the base material may be heated to or near the melting point of the thermoplastic material without charring or discoloring. By the use of such a temperature in the base material, the thermoplastic material penetrates further and closer into the fibres or filaments or other parts of the base material and, although it may be transparent, it is not produced in an off color by the inclusion of charred fragments of the base material. By employing this invention there is a further advantage in that the base material is not made crisp and/or brittle due to the high temperature employed to obtain the good adhesion and the finished product therefore has longer life and greater flexibility. This invention results in a finished product when the thermoplastic material is impregnated into a flexible fabric such as a cotton duck which is pliable, soft of hand and of a leather-like feel and is excellent for use as an imitation leather. Due to the retention of the natural flexibility of the base material there is no tendency upon flexing for the coating of thermoplastic material to peel or crack.

By employing this invention, the fabric may be raised, without injury, to a temperature sufficient to give the best penetration of the thermoplastic material which may be from 100° C. to over 200° C. Further, by reason that the treating agent, which is applied to the fabric for the purpose of maintaining the natural texture of the base material during preheating, is compatible with the thermoplastic material to be applied, a more firm and penetrating union between the base material and the thermoplastic material is obtained.

In accordance with my invention I pretreat or impregnate the fabric, felt, paper, etc. that is to be impregnated or surfaced, with an aqueous solution of glycerine or glycol, their substitution products and derivatives thereof, such as diethylene glycol and triethylene glycol, etc., which solution adds to the fabric, felt, paper, etc. a liquid that maintains the fabric, felt, paper, etc. moist even at high temperatures. I then preheat the fabric, felt, paper, etc. and impregnate the same with a heated thermoplastic material with the aid of pressure and, if desired, additional heat. By so treating or impregnating the fabric, felt, paper, etc. with glycerine, glycol or their derivatives and substitution products, they are prevented from charring or becoming excessively dry and brittle while at the same time they are more receptive to the thermoplastic material.

In employing this invention a high temperature pretreated base material is joined with the heated thermoplastic material at such temperatures that there is ready penetration of the thermoplastic material into the base material and it is not necessary in applying the pressure necessary to permeate the thermoplastic compound through the base material to apply such a great pressure that the base material is disturbed, disrupted or distorted. By this invention the amount of pressure applied may be used to control the depth of penetration of the thermoplastic material into the base material. Thus, if it is desired to merely coat the base material, a light pressure may be employed while if it is desired to force the thermoplastic material entirely through the base material to form a base material imbedded in the thermoplastic material a higher pressure may be employed. By controlling penetration and permeation of the plastic compound into or through the base material an even, uniform, lustre, color or effect is gained regardless of the unevenness of the structure of the base material or its uneven absorptive properties.

This invention is applicable to the treatment of fabrics formed by weaving, netting, knotting or knitting yarns or filaments of silk, wool, cotton or the artificial yarns such as reconstituted cellulose. This invention is also applicable to the treatment of wire mesh, hair-felts, paper, cardboard, fabrics containing asbestos or other porous, rigid or flexible material. Such material when treated present a permanent water and oil resistant surface material that may be used in place of leather, oilcloths, linoleum or other covering materials to be veneered on to iron, wood or other rigid or flexible material to form a surface for floors, furniture, automobile bodies, walls, counters, containers or any other surface or article.

Any suitable organic thermoplastic compound may be employed as the impregnating and/or surfacing substance. For instance, I may employ derivatives of cellulose such as cellulose nitrate or organic derivatives of cellulose. The organic derivatives of cellulose may be organic esters of cellulose such as cellulose acetate, cellulose formate, cellulose propionate or cellulose butyrate, or cellulose ethers such as ethyl cellulose, methyl cellulose and benzyl cellulose. Thermoplastic compounds other than derivatives of cellulose, such as halogenated rubber, vinyl resins and the like, may be employed in this invention.

Any desired modifying agent may be added to the thermoplastic compound. By "modifying agent" I mean any substance which is adapted to impart any desired properties to the finished article such as softness, elasticity, flexibility, hardness, gloss, color, stability, etc. to the finished product. Such modifying agents may be plasticizers, dyes, pigments, lakes, filling material, resins, oils, etc. Examples of plasticizers are camphor, dibutyl phthalate, diethyl phthalate, tricresyl phosphate, triphenyl phosphate, ethyl-para-toluene-sulfonamid, etc., the choice of plasticizer depending upon the properties of the thermoplastic compound employed and the desired result. Filling materials and/or pigments such as clay, metallic oxides and salts and organic compounds may be added. Any suitable oil may be employed such as mineral oil, natural or oxidized, vegetable oils, animal oils, etc.

The thermoplastic material may be formed into a sheet in any suitable manner and then applied to the preheated base material. However, it is preferable that the thermoplastic composition be applied to the fabric or material to be treated while in a loosely formed sheet or layer, i. e. a sheet formed from a powder wherein the particles are left partially in the powder form. Thus, a sheet or layer of an intimate mixture of a derivative of cellulose, plasticizer and effect material containing substantially no volatile solvents and in the form of wholly or partially compressed powder may be applied to the surface of the base material to be impregnated therewith, which base material is preferably preheated, and the assembly pressed at elevated temperatures. While such powder may be prepared in any suitable manner, the best results are obtained with the use of a powder formed by simultaneously grinding and disbursing a derivative of cellulose and plasticizer in the presence of a liquid that is a non-solvent for the derivative of cellulose, for instance, by forcing the suspension of the derivative of cellulose plasticizer and non-solvent liquid in a colloid mill between two discs having opposing abrasive surfaces and having a relatively opposite rotating movement as is described in U. S. application S. No. 663,344 filed March 29, 1933. Alternatively, the thermoplastic composition may comprise an intimate mixture of a derivative of cellulose, plasticizer and rubber that may be formed in a similar manner to that described in U. S. application S. No. 671,642 filed May 18, 1933. Further, in place of employing powder of plastic material to form the sheet, a film or foil, made by any suitable method, may be passed through a calender and heated to the desired temperature and the same applied to the base material.

When employing powder as the material for forming the sheet or layer of thermoplastic material, in order to avoid the cost of forming such sheets or layers as a separate operation then cooling and reheating and also the danger of contamination of the same through handling, they may be formed in an operation continuous with that in which they are pressed into the selected base material. In this case the thermoplastic composition, in the form of a press mass powder comprising an intimate mixture of a derivative of cellulose, plasticizer, with or without rubber, may be passed between heated rolls that are so spaced that they form a sheet of the plastic powder. These sheets, while still containing the heat of sheet formation and while in a semi-fluid condition, may be still further heated and pressed into a heated web, sheet or platen of base material such as a fabric. The sheets so formed, or film or foil if such be used, may be of any desired thickness, say from $1/1000$ of an inch to more than $1/10$ of an inch and may vary from slightly less than solid density to solid density; i. e. the pressed mass powder sheet may be heated and pressed on the calender until it forms a solid film, every particle in which has been fused and flattened, or the particles may be fused to such an extent that each particle adheres to its neighboring particles yet a certain percentage of them have not been flattened nor lost their particle shape with interstices between them.

The base material to which the thermoplastic material is to be applied may be preheated by passing the same, if in the nature of a fabric, about or between one or a series of heated rolls or the same may be conducted through a heated chamber or passed between relatively closely-spaced heated plates. The heating elements of the rolls, chamber or plates may be an open gas or oil flame, electrical conductance or resistance coils, steam, hot water or a heated liquid. The preheating of the base material may be such as to raise the base material to substantially that temperature at which the thermoplastic composition should be when it is applied, or its temperature just prior to union of the two materials. Thus, for example, in employing an organic derivative of cellulose thermoplastic material containing plasticizer and oil the temperature of the base material that is desired may be around 190° C., which temperature tends to char, discolor and make brittle many textile materials such as cotton duck, cotton felt and the like. To prevent this, the fabric or other base material is preferably treated or impregnated with a solution of glycerine or a glycol and their substitution and derivative products, for example diethylene glycol and triethylene glycol, such that from $1/2$ to more than 10 per cent of the glycerine or glycol compound on the weight of the base material is added to same. This may be applied to the base material by passing the base material through an aqueous bath containing from 1 to 30% or more of the polyhydric alcohol material dissolved in water prior to passing the base material through the heating element. In a process where the base material passes through the heating element, the water contained therein is driven off yet the fabric is not made brittle as it is maintained moist by the polyhydric alcohol or its derivative that have boiling points at about up to or above 200° C. Although from ½ to 10% of the polyhydric alcohol is normally sufficient, greater amounts may be employed especially when working delicate fabrics, etc. For instance, the amount of polyhydric alcohol applied to the base material may be as high as 25% or more on the weight of the base material. The term "polyhydric alcohol body" used in the specification is intended to mean glycerine, glycols and/or their derivatives and susbtitution products for instance diethylene glycol, triethylene glycol, etc.

The impregnated base material while still hot may be passed between matrixes, rollers, engraving rollers, etc. for the purpose of embossing thereon or embossing into the thermoplastic material any desired design such as those in imitation of leather, such as pigskin, skiver, Morocco or in designs of flowers, checks, lines or other patterns or designs. Further, the impregnated base material may be chilled by passing the same over cooled rollers or through a cooled chamber to set the material and then the same is a heavy semiflexible material suitable for use for counter tops, table tops and the like. They may be polished by passing the same through suitable polishing machines consisting of rotating polishing discs or any other suitable finish may be applied to the base material.

After the finishing operation or before if desired the impregnated material may be washed with water if there is any excess polyhydric alcohol remaining thereon. The washing may consist of passing the material through a bath of water or water may be sprayed upon the back of the material.

It is to be understood that the foregoing detailed description is given merely by way of illustration and that many variations may be made therein without departing from the spirit of my invention.

Having described my invention, what I desire to secure by Letters Patent is:

1. A process of impregnating a non-thermoplastic base with a thermoplastic material selected from the group consisting of cellulose derivatives, resins and halogenated rubber, which comprises impregnating the said base with a substance selected from the group consisting of glycerine, glycol, diethylene glycol and triethylene glycol, which substance is a non-solvent for said thermoplastic material at room temperature, heating the said base and pressing on to it a heated sheet of thermoplastic material.

2. A process of surfacing a non-thermoplastic base with a thermoplastic material containing an organic derivative of cellulose, which comprises impregnating the said base with a substance selected from the group consisting of glycerine, glycol, diethylene glycol and triethylene glycol, which substance is a non-solvent for the cellulose derivative at room temperature, heating the said base and pressing on to it a heated sheet of a thermoplastic material containing an organic derivative of cellulose.

3. A process of surfacing a non-thermoplastic base with a thermoplastic material containing cellulose acetate, which comprises impregnating the said base with a substance selected from the group consisting of glycerine, glycol, diethylene glycol and triethylene glycol, which substance is a non-solvent for cellulose acetate at room temperature, heating the said base and pressing on to it a heated sheet of a thermoplastic material containing cellulose acetate.

4. A process of surfacing a non-thermoplastic base with a thermoplastic material containing an organic derivative of cellulose, which comprises impregnating the said base with glycerine, heating the said base to above 150° C. and pressing on to it a sheet of a thermoplastic material containing an organic derivative of cellulose heated to above 150° C.

5. A process of surfacing a non-thermoplastic base with a thermoplastic material containing cellulose acetate, which comprises impregnating the said base with glycerine, heating the said base to above 150° C. and pressing on to it a sheet of a thermoplastic material containing cellulose acetate heated to above 150° C.

6. A process of surfacinug a non-thermoplastic base with a thermoplastic material containing cellulose acetate, which comprises adding to the said base from ½ to 10% of a substance selected from the group consisting of glycerine, glycol, diethylene glycol and triethylene glycol, which substance is a non-solvent for cellulose acetate at room temperature, heating the said base to above 150° C. and pressing on to it a sheet of a thermoplastic material containing cellulose acetate heated to above 150° C.

7. A process of surfacing a non-thermoplastic base with a thermoplastic material containing an organic derivative of cellulose, which comprises adding to the said base a substance selected from the group consisting of glycerine, glycol, diethylene glycol and triethylene glycol, which substance is a non-solvent for said cellulose derivative at room temperature, applying thereto under heat and pressure the thermoplastic material containing an organic derivative of cellulose and removing the excess of the said substance.

8. A process of surfacing a non-thermoplastic base with a thermoplastic material containing cellulose acetate, which comprises adding to the said base a substance selected from the group consisting of glycerine, glycol, diethylene glycol and triethylene glycol, which substance is a non-solvent for the cellulose acetate at room temperature, applying thereto under heat and pressure a sheet of the thermoplastic material containing cellulose acetate and removing the excess of the said substance.

9. A laminated sheet comprising a self-supporting sheet of a non-thermoplastic material impregnated with a substance selected from the group consisting of glycerine, glycol, diethylene glycol and triethylene glycol and a self-supporting sheet of a thermoplastic material, selected from the group consisting of cellulose derivatives, resins and halogenated rubber, stuck together, said substance being a non-solvent for said thermoplastic material at room temperatures.

10. A laminated sheet comprising a self-supporting sheet of a non-thermoplastic material impregnated with a substance selected from the group consisting of glycerine, glycol, diethylene glycol and triethylene glycol and a self-supporting sheet of a thermoplastic material containing an organic derivative of cellulose stuck together, said substance being a non-solvent for said thermoplastic material at room temperatures.

11. A laminated sheet comprising a self-supporting sheet of a non-thermoplastic impregnated with a substance selected from the group consisting of glycerine, glycol, diethylene glycol and triethylene glycol and a self-supporting sheet of a thermoplastic material containing cellulose acetate stuck together, said substance being a non solvent for said thermoplastic material at room temperatures.

12. An imitation leather comprising a woven cotton base impregnated with a substance selected from the group consisting of glycerine, glycol, diethylene glycol and triethylene glycol and a self-supporting sheet of a thermoplastic material containing an organic derivative of cellulose stuck together, said substance being a non-solvent for said thermoplastic material at room temperatures.

13. An imitation leather comprising a woven cotton base impregnated with a substance selected from the group consisting of glycerine, glycol, diethylene glycol and triethylene glycol and a self-supporting sheet of a thermoplastic material containing cellulose acetate stuck together, said substance being a non-solvent for said thermoplastic material at room temperatures.

14. A laminated article comprising a self-supporting sheet of a non-thermoplastic material impregnated with glycerine and a self-supporting sheet of thermoplastic material containing cellulose acetate stuck together.

15. A laminated article comprising a self-supporting sheet of a non-thermoplastic material impregnated with glycol and a self-supporting sheet of thermoplastic material containing cellulose acetate stuck together.

16. A laminated article comprising a self-supporting sheet of a non-thermoplastic material impregnated with from ½ to 10% of a substance selected from the group consisting of glycerine, glycol, diethylene glycol and triethylene glycol and a self-supporting sheet of a thermoplastic material containing cellulose acetate stuck together, said substance being a non-solvent for said thermoplastic material at room temperatures.

GEORGE SCHNEIDER.

CERTIFICATE OF CORRECTION.

Patent No. 2,147,757.            February 21, 1939.

GEORGE SCHNEIDER.

It is hereby certified that error appears in the printed specification of the above numbered patent requiring correction as follows: Page 3, second column, line 45, claim 7, after the word "pressure" insert a sheet of; and that the said Letters Patent should be read with this correction therein that the same may conform to the record of the case in the Patent Office.

Signed and sealed this 25th day of April, A. D. 1939.

(Seal)

Henry Van Arsdale
Acting Commissioner of Patents.

said substance being a non-solvent for said thermoplastic material at room temperatures.

11. A laminated sheet comprising a self-supporting sheet of a non-thermoplastic impregnated with a substance selected from the group consisting of glycerine, glycol, diethylene glycol and triethylene glycol and a self-supporting sheet of a thermoplastic material containing cellulose acetate stuck together, said substance being a non solvent for said thermoplastic material at room temperatures.

12. An imitation leather comprising a woven cotton base impregnated with a substance selected from the group consisting of glycerine, glycol, diethylene glycol and triethylene glycol and a self-supporting sheet of a thermoplastic material containing an organic derivative of cellulose stuck together, said substance being a non-solvent for said thermoplastic material at room temperatures.

13. An imitation leather comprising a woven cotton base impregnated with a substance selected from the group consisting of glycerine, glycol, diethylene glycol and triethylene glycol and a self-supporting sheet of a thermoplastic material containing cellulose acetate stuck together, said substance being a non-solvent for said thermoplastic material at room temperatures.

14. A laminated article comprising a self-supporting sheet of a non-thermoplastic material impregnated with glycerine and a self-supporting sheet of thermoplastic material containing cellulose acetate stuck together.

15. A laminated article comprising a self-supporting sheet of a non-thermoplastic material impregnated with glycol and a self-supporting sheet of thermoplastic material containing cellulose acetate stuck together.

16. A laminated article comprising a self-supporting sheet of a non-thermoplastic material impregnated with from ½ to 10% of a substance selected from the group consisting of glycerine, glycol, diethylene glycol and triethylene glycol and a self-supporting sheet of a thermoplastic material containing cellulose acetate stuck together, said substance being a non-solvent for said thermoplastic material at room temperatures.

GEORGE SCHNEIDER.

CERTIFICATE OF CORRECTION.

Patent No. 2,147,757. February 21, 1939.

GEORGE SCHNEIDER.

It is hereby certified that error appears in the printed specification of the above numbered patent requiring correction as follows: Page 3, second column, line 45, claim 7, after the word "pressure" insert a sheet of; and that the said Letters Patent should be read with this correction therein that the same may conform to the record of the case in the Patent Office.

Signed and sealed this 25th day of April, A. D. 1939.

Henry Van Arsdale
Acting Commissioner of Patents.

(Seal)